US012804359B2

(12) United States Patent
Iwasaki et al.

(10) Patent No.: US 12,804,359 B2
(45) Date of Patent: Nov. 17, 2026

(54) WIRELESS COMMUNICATION DEVICE AND WIRELESS COMMUNICATION METHOD

(71) Applicant: JVCKENWOOD Corporation, Yokohama (JP)

(72) Inventors: Akimi Iwasaki, Yokohama (JP); Toshinobu Hiromori, Yokohama (JP); Toshitaka Matsuoka, Yokohama (JP); Ryoji Kirihara, Yokohama (JP); Hideaki Shimoda, Yokohama (JP); Takuya Ozawa, Yokohama (JP); Hiroaki Kumashiro, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 260 days.

(21) Appl. No.: 18/822,513

(22) Filed: Sep. 3, 2024

(65) Prior Publication Data

US 2024/0430646 A1 Dec. 26, 2024

Related U.S. Application Data

(63) Continuation of application No. PCT/JP2023/004403, filed on Feb. 9, 2023.

(30) Foreign Application Priority Data

Mar. 14, 2022 (JP) ................................ 2022-039654

(51) Int. Cl.
*H04B 7/00* (2006.01)
*H04W 4/08* (2009.01)

(52) U.S. Cl.
CPC .................................... *H04W 4/08* (2013.01)

(58) Field of Classification Search
CPC ......... H04W 4/029; H04W 4/06; H04W 4/08; H04W 72/121
See application file for complete search history.

(56) References Cited

U.S. PATENT DOCUMENTS

| | | | | |
|---|---|---|---|---|
| 9,619,986 B2 * | 4/2017 | Seol | ....................... | G06Q 10/00 |
| 2023/0069236 A1 * | 3/2023 | Kozin | .................. | H04W 64/00 |
| 2025/0202603 A1 * | 6/2025 | Knode | .................. | H04B 17/29 |

FOREIGN PATENT DOCUMENTS

JP 2009-265958 11/2009

OTHER PUBLICATIONS

International Search Report and Written Opinion for International Application Serial No. PCT/JP2023/004403 mailed on Apr. 18, 2023, 8 pages.

* cited by examiner

*Primary Examiner* — Tuan Pham
(74) *Attorney, Agent, or Firm* — Amin, Turocy & Watson, LLP

(57) ABSTRACT

A wireless communication device includes: a reception unit configured to receive, by a first channel, a group formation request signal from a management device and a group participation request signal from each of leader devices; a mode setting unit configured to set, when the group formation request signal is received, a group formation mode during a first duration determined in advance; a storage configured to receive the group participation request signal and store a radio field strength when receiving the group participation request signal and an identifier of the leader device in an associated manner during the group formation mode; a selection unit configured to select, when the group formation mode is terminated, the leader device the radio field strength of which has a largest value; and a transmission unit configured to transmit, by a second channel, a (Continued)

group participation application signal to the selected leader device.

5 Claims, 14 Drawing Sheets

FIG.3

50a

| WIRELESS COMMUNICATION DEVICE | IDENTIFIER |
|---|---|
| MANAGEMENT DEVICE 10 | UID1 |
| LEADER DEVICE 20-1 | UID2 |
| LEADER DEVICE 20-2 | UID3 |
| ... | ... |
| LEADER DEVICE 20-8 | UID9 |
| GENERAL DEVICE 30-1 | UID10 |
| GENERAL DEVICE 30-2 | UID11 |
| ... | ... |
| GENERAL DEVICE 30-n | UIDn |

FIG.4

50b

| CHANNEL No | USAGE |
|---|---|
| CH1 | NORMAL USE, MESSAGE TRANSMISSION |
| CH2 | USED BY LEADER DEVICE 20-1 |
| CH3 | USED BY LEADER DEVICE 20-2 |
| CH4 | USED BY LEADER DEVICE 20-3 |
| CH5 | USED BY LEADER DEVICE 20-4 |
| CH6 | USED BY LEADER DEVICE 20-5 |
| CH7 | USED BY LEADER DEVICE 20-6 |
| CH8 | USED BY LEADER DEVICE 20-7 |
| CH9 | USED BY LEADER DEVICE 20-8 |

CALL

WIRELESS COMMUNICATION DEVICE AND WIRELESS COMMUNICATION METHOD

CROSS-REFERENCE TO RELATED APPLICATIONS

This application is a Continuation of PCT International Application No. PCT/JP2023/004403 filed on Feb. 9, 2023 which claims the benefit of priority from Japanese Patent Application No. 2022-039654 filed on Mar. 14, 2022, the entire contents of both of which are incorporated herein by reference.

FIELD OF THE INVENTION

The present disclosure relates to a wireless communication device and a wireless communication method.

BACKGROUND OF THE INVENTION

A technology in which a base station forms a group of multiple wireless communication devices and enables group communication is known. Japanese Laid-open Patent Publication No. 2009-265958 discloses a technology for forming a group by transmitting, via a base station, a group number to wireless communication devices in accordance with situation.

In general, a group of multiple wireless communication devices is formed by a base station. Therefore, a wireless communication device itself is not able to dynamically form a group in accordance with an activity state of the group, and therefore, it is difficult to form a group in which an intention of a user who owns the wireless communication device is reflected.

SUMMARY OF THE INVENTION

A wireless communication device and a wireless communication method are disclosed.

According to one aspect of the present application, there is provided a wireless communication device comprising: a reception unit configured to receive, by a first channel, a group formation request signal from a management device and a group participation request signal from each of leader devices; a mode setting unit configured to set, when the group formation request signal is received, a group formation mode in the wireless communication device during a first duration that is determined in advance; a storage configured to receive the group participation request signal from each of the leader devices and store therein a radio field strength at a time of receiving the group participation request signal and an identifier of the leader device that has transmitted the group participation request signal in an associated manner during a period of the group formation mode; a selection unit configured to select, when the period of the group formation mode is terminated, the leader device the radio field strength of which, stored in the storage, has a largest value; and a transmission unit configured to transmit, by a second channel that is different from the first channel, a group participation application signal to the leader device that is selected by the selection unit.

According to one aspect of the present application, there is provided a wireless communication method comprising: receiving, by a first channel, a group formation request signal from a management device and a group participation request signal from each of leader devices; setting, when the group formation request signal is received, a group formation mode in the wireless communication device during a first duration that is determined in advance; receiving the group participation request signal from each of the leader devices and storing a radio field strength at a time of receiving the group participation request signal and an identifier of the leader device that has transmitted the group participation request signal in an associated manner in a storage during a period of the group formation mode; selecting, when the period of the group formation mode is terminated, the leader device the radio field strength of which, stored in the storage, has a largest value; and transmitting, by a second channel that is different from the first channel, a group participation application signal to the selected leader device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a device list according to one embodiment;

FIG. 4 is a diagram illustrating an example of a channel list according to one embodiment;

DETAILED DESCRIPTION OF THE INVENTION

Embodiments according to the present disclosure will be described in detail below with reference to the accompanying drawings. The present disclosure is not limited by the embodiments below, and in the embodiments below, the same components are denoted by the same reference symbols and repeated explanation thereof will be omitted.

EMBODIMENT

Wireless Communication System

Figure 1:
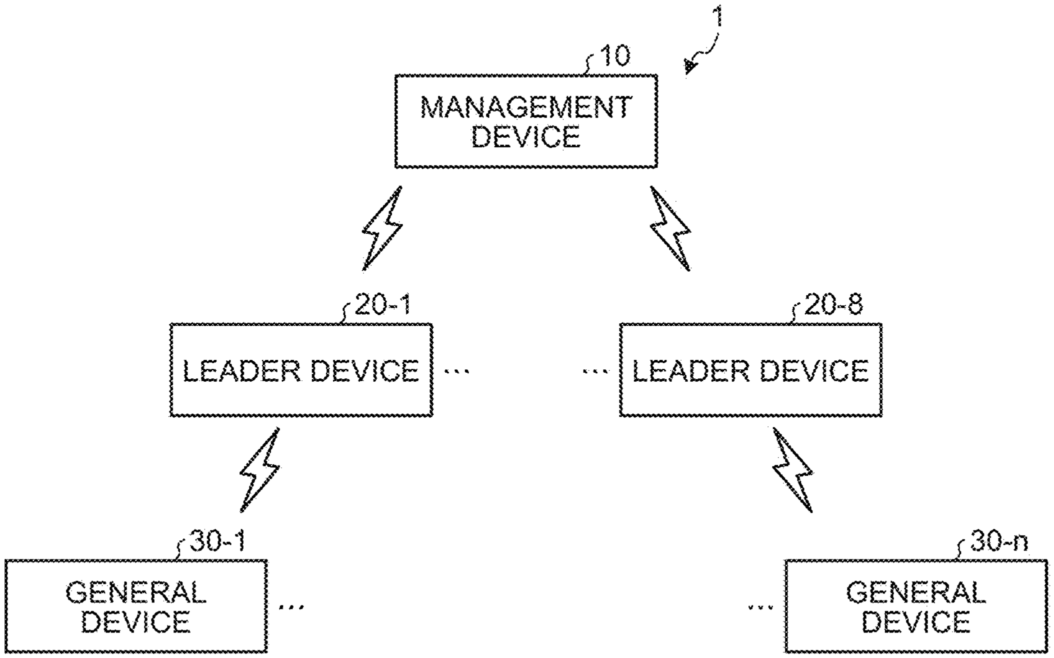
FIG. 1 is a diagram illustrating a configuration example of a wireless communication system according to one embodiment.

A configuration example of a wireless communication system according to one embodiment will be described below with reference to FIG. 1. FIG. 1 is a diagram illustrating a configuration example of a wireless communication system according to one embodiment.

As illustrated in FIG. 1, a wireless communication system 1 includes a management device 10, a leader device 20-1 to a leader device 20-8, and a general device 30-1 to a general device **30-*n* (n is an integer equal to or larger than 2). The leader device 20-1 to the leader device 20-8 may collectively be referred to as a leader device 20. The general device 30-1 to the general device 30-*n* may collectively be referred to as a general device 30. The wireless communication system 1** may include, for example, a base station device (not illustrated) that relays wireless communication.

In the present embodiment, the wireless communication system 1 is, for example, a system that is used in an event venue of various kinds of events that are held indoors or outdoors. The wireless communication system 1 is configured such that the general device 30 performs group communication with the other general devices 30 including the leader device 20.

The management device 10 manages the wireless communication system 1. The management device 10 manages, for example, group communication among the multiple general device 30 in the wireless communication system 1. The wireless communication system 1 includes only one single management device 10. The management device 10 is, for example, a wireless communication device for business use.

The leader device 20 manages the general device 30. The leader device 20 forms a group for which the general device 30 performs group communication. In the example illustrated in FIG. 1, the wireless communication system 1 includes the eight leader devices 20. In the following, explanation will be given based on the assumption that the eight leader devices 20 are provided, but the present disclosure is not limited to this example. The number of the leader devices 20 may be equal to or larger than 8, or may be smaller than 8. The leader device 20 is, for example, a wireless communication device for business use. The leader device 20 may be held by a user or may be fixed in a predetermined location. When the leader device 20 is fixed in a predetermined location, the leader device 20 need to be arranged so as to cover a communication area of the wireless communication system 1.

The general device 30 performs group communication with the other general devices 30. The general device 30 belongs to a certain group that is formed by one of the leader devices 20. The general device 30 performs group communication or individual communication with the other general devices 30 in the same group including the leader device 20. The general device 30 may also be referred to as a general device. The general device 30 is, for example, a wireless communication device for business use.

Configuration of Management Device

Figure 2:
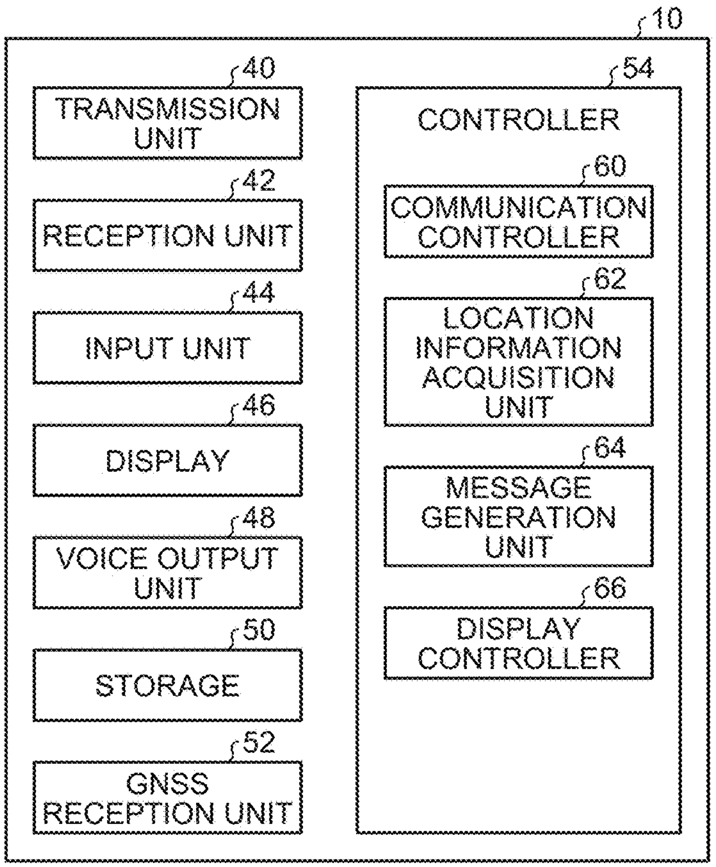
FIG. 2 is a block diagram illustrating a configuration example of a management device according to one embodiment.

A configuration example of the management device according to one embodiment will be described below with reference to FIG. 2. FIG. 2 is a block diagram illustrating a configuration example of the management device according to one embodiment.

As illustrated in FIG. 2, the management device 10 includes a transmission unit 40, a reception unit 42, an input unit 44, a display 46, a voice output unit 48, a storage 50, a Global Navigation Satellite System (GNSS) reception unit 52, and a controller 54.

The transmission unit 40 transmits a voice signal and various kinds of information to an external device. The transmission unit 40 transmits a voice signal and various kinds of information to, for example, the leader device 20 and the general device 30. Details of the transmission unit 40 will be described later.

The reception unit 42 receives a voice signal and various kinds of information from an external device. The reception unit 42 receives a voice signal and various kinds of information from, for example, the leader device 20 and the general device 30. Details of the reception unit 42 will be described later.

The input unit 44 receives various kinds of input operation with respect to the management device 10. The input unit 44 outputs an input signal corresponding to the received input operation to the controller 54. The input unit 44 includes, for example, a touch panel, a button, a switch, a microphone, or the like. The input unit 44 includes, for example, a Push to Talk (PTT) button for starting a call. When a touch panel is used as the input unit 44, the input unit 44 is arranged on the display 46.

The display 46 displays various kinds of videos. The display 46 is, for example, a display including a Liquid Crystal Display (LCD), organic Electro-Luminescence (EL), or the like.

The voice output unit 48 is a speaker that outputs various kinds of voices.

The storage 50 stores therein various kinds of information. The storage 50 stores therein information such as calculation details of the controller 54 and a program. The storage 50 stores therein, for example, a device list for uniquely identifying each of the leader device 20 and the general device 30 that are included in the wireless communication system 1. The storage 50 stores therein, for example, a channel list in which the leader device 20 and a channel that is used by the leader device 20 are associated with each other. The storage 50 includes, for example, at least one of a main storage device such as a Random Access Memory (RAM) or a Read Only Memory (ROM), and an external storage device such as a Hard Disk Drive (HDD).

FIG. 3 is a diagram illustrating an example of the device list according to one embodiment. As illustrated in FIG. 3, a device list **50*a*** includes items such as a "wireless communication device" and an "identifier".

The "wireless communication device" indicates a wireless communication device that is included in the wireless communication system 1 that is managed by the management device 10. The "identifier" indicates an ID for uniquely identifying each of the wireless communication devices included in the wireless communication system 1 that is managed by the management device 10.

In the example illustrated in FIG. 3, for example, it is indicated that an identifier of the "management device 10" is "UID1". Further, for example, it is indicated that an identifier of the "leader device 20-1" is "UID2". Furthermore, for example, it is indicated that an identifier of the "general device 30-1" is "UID10".

FIG. 4 is a diagram illustrating an example of the channel list according to one embodiment. As illustrated in FIG. 4, a channel list 50*b* includes items such as a "channel No" and a "usage".

The "channel No" indicates a channel that is used for communication. The "usage" indicates a usage of a corresponding channel. The channel identifies, for example, a frequency, a thread, or the like that is used for the communication. When the wireless communication system 1 includes a base station device (not illustrated), the channel is, for example, a relay channel that is managed by the base station device.

In the example illustrated in FIG. 4, for example, it is indicated that a usage of "CH1" is "normal use, message transmission". For example, it is indicated that a usage of "CH2" is "used by the leader device 20-1". For example, it is indicated that a usage of "CH9" is "used by the leader device 20-8".

The GNSS reception unit 52 is configured with a GNSS receiver or the like that receives GNSS signals from GNSS satellites. The GNSS reception unit 52 outputs a received GNSS signal to a location information acquisition unit 62 of the controller 54.

The controller 54 controls each of the units of the management device 10. The controller 54 includes, for example, an information processing device such as a Central Processing Unit (CPU) or a Micro Processing Unit (MPU), and a storage such as a RAM or a ROM. The controller 54 executes a program that controls operation of the management device 10 according to the present application. The controller 54 may be implemented by, for example, an integrated circuit such as an Application Specific Integrated Circuit (ASIC) or a Field Programmable Gate Array (FPGA). The controller 54 may be implemented by a combination of hardware and software.

The controller 54 includes a communication controller 60, the location information acquisition unit 62, a message generation unit 64, and a display controller 66.

The communication controller 60 controls the transmission unit 40 and the reception unit 42. The communication controller 60 causes the transmission unit 40 to transmit various kinds of information to the leader device 20 and the general device 30. The communication controller 60 causes the reception unit 42 to receive various kinds of information from the leader device 20 and the general device 30.

The location information acquisition unit 62 acquires current location information that indicates a current location of the management device 10. The location information acquisition unit 62 acquires the current location information on the management device 10 based on the GNSS signal that is received by the GNSS reception unit 52.

The message generation unit 64 generates a group formation request message for causing the leader device 20 to form a group of the general devices 30. Details of the message generation unit 64 will be described later.

The display controller 66 causes the display unit 46 to display various kinds of information. Details of the display controller 66 will be described later.

Configuration of Leader Device

Figure 5:
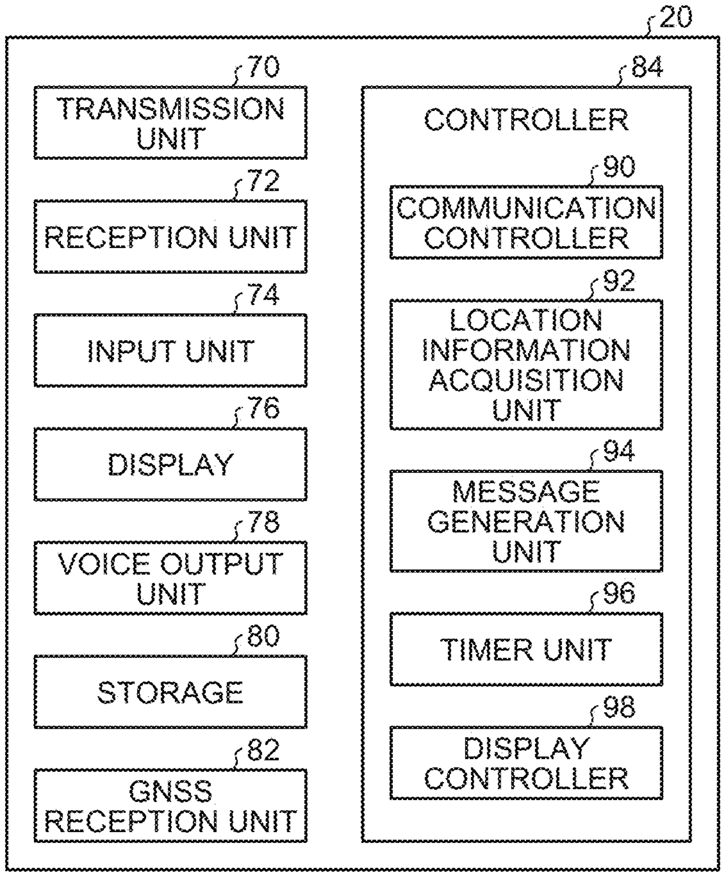
FIG. 5 is a block diagram illustrating a configuration example of a leader device according to one embodiment.

A configuration example of the leader device according to one embodiment will be described below with reference to FIG. 5. FIG. 5 is a block diagram illustrating a configuration example of the leader device according to one embodiment.

As illustrated in FIG. 5, the leader device 20 includes a transmission unit 70, a reception unit 72, an input unit 74, a display 76, a voice output unit 78, a storage 80, a GNSS reception unit 82, and a controller 84.

The transmission unit 70 transmits a voice signal and various kinds of information to an external device. The transmission unit 70 transmits a voice signal and various kinds of information to, for example, the management device 10 and the general device 30. Details of the transmission unit 70 will be described later.

The reception unit 72 receives a voice signal and various kinds of information from an external device. The reception unit 72 receives a voice signal and various kinds of information from, for example, the management device 10 and the general device 30. Details of the reception unit 72 will be described later.

The input unit 74 receives various kinds of input operation with respect to the leader device 20. The input unit 74 outputs an input signal corresponding to the received input operation to the controller 84. The input unit 74 includes, for example, a touch panel, a button, a switch, a microphone, or the like. The input unit 74 includes, for example, a PTT button for starting a call. When a touch panel is used as the input unit 74, the input unit 74 is arranged on the display 76.

The display 76 displays various kinds of videos. The display 76 is, for example, a display including a liquid crystal display, organic EL, or the like.

The voice output unit 78 is a speaker that outputs various kinds of voices.

The storage 80 stores therein various kinds of information. The storage 80 stores therein information such as calculation details of the controller 84 and a program. The storage 80 stores therein, for example, a Received Signal Strength Indicator (RSSI) value that indicates a radio field strength of the channel at a time of reception of a signal from the general device that belongs to the group of the leader device 20. The storage 80 includes, for example, at least one of a main storage device such as a RAM or a ROM, and an external storage device such as an HDD.

The GNSS reception unit 82 is configured with a GNSS receiver or the like that receives GNSS signals from GNSS satellites. The GNSS reception unit 82 outputs the received GNSS signal to a location information acquisition unit 92 of the controller 84.

The controller 84 controls each of the units of the leader device 20. The controller 84 includes, for example, an information processing device such as a CPU or an MPU and a storage such as a RAM or a ROM. The controller 84 executes a program that controls operation of the leader device 20 according to the present application. The controller 84 may be implemented by, for example, an integrated circuit such as an ASIC or an FPGA. The controller 84 may be implemented by a combination of hardware and software.

The controller 84 includes a communication controller 90, the location information acquisition unit 92, a message generation unit 94, a timer unit 96, and a display controller 98.

The communication controller 90 controls the transmission unit 70 and the reception unit 72. The communication controller 90 causes the transmission unit 70 to transmit various kinds of information to the management device 10 and the general device 30. The communication controller 90 causes the reception unit 72 to receive various kinds of information from the management device 10 and the general device 30.

The location information acquisition unit 92 acquires current location information that indicates a current location of the leader device 20. The location information acquisition unit 92 acquires the current location information on the leader device 20 based on the GNSS signal that is received by the GNSS reception unit 82.

The message generation unit 94 generates, when the group formation request message is received from the management device 10, a group participation request message in order to form a group. Details of the message generation unit 94 will be described later.

The timer unit 96 measures a time. The timer unit 96 measures a time for receiving participation in the group from the general device 30. Details of the timer unit 96 will be described later.

The display controller 98 causes the display 76 to display various kinds of information. Details of the display controller 98 will be described later.

Configuration of General Device

Figure 6:
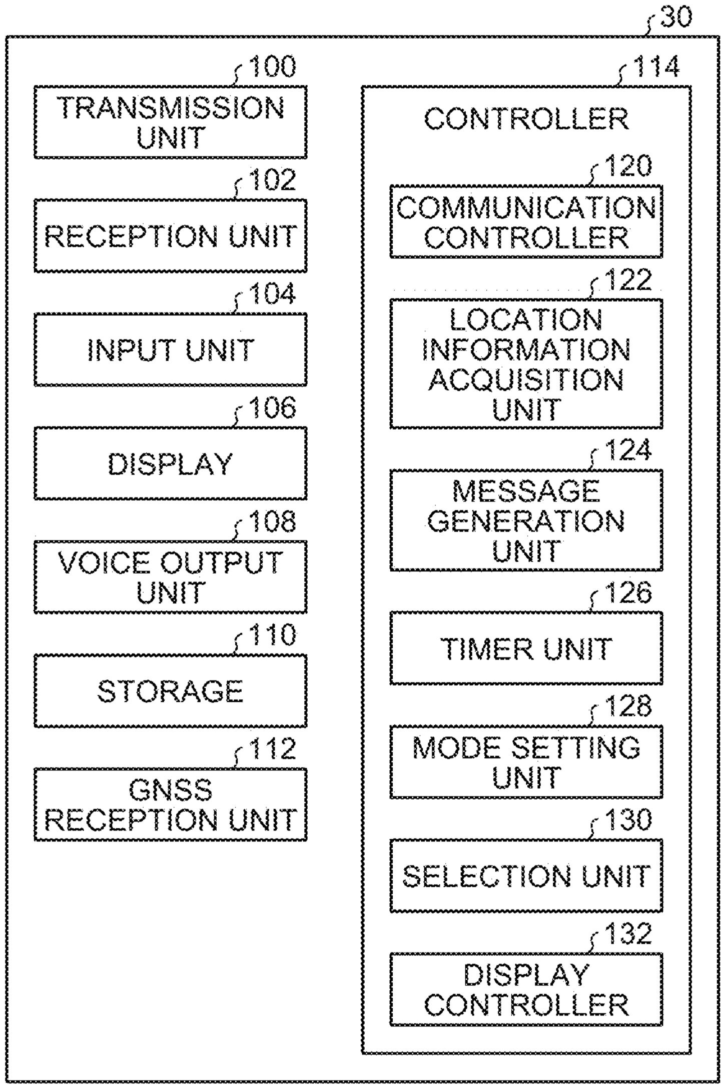
FIG. 6 is a block diagram illustrating a configuration example of a wireless communication device according to one embodiment.

A configuration example of the general device according to one embodiment will be described below with reference to FIG. 6. FIG. 6 is a block diagram illustrating a configuration example of the general device according to one embodiment.

As illustrated in FIG. 6, the general device 30 includes a transmission unit 100, a reception unit 102, an input unit 104, a display 106, a voice output unit 108, a storage 110, a GNSS reception unit 112, and a controller 114.

The transmission unit 100 transmits a voice signal and various kinds of information to an external device. The transmission unit 100 transmits a voice signal and various kinds of information to, for example, the management device 10 and the leader device 20. Details of the transmission unit 100 will be described later.

The reception unit 102 receives a voice signal and various kinds of information from an external device. The reception unit 102 receives a voice signal and various kinds of information from, for example, the management device 10 and the leader device 20. Details of the reception unit 102 will be described later.

The input unit 104 receives various kinds of input operation with respect to the general device 30. The input unit 104 outputs an input signal corresponding to the received input operation to the controller 114. The input unit 104 includes, for example, a touch panel, a button, a switch, a microphone, or the like. The input unit 104 includes, for example, a PTT button for starting a call. When a touch panel is used as the input unit 104, the input unit 104 is arranged on the display 106.

the display 106 displays various kinds of videos. The display 106 is, for example, a display including a liquid crystal display, organic EL, or the like.

The voice output unit 108 is a speaker that outputs various kinds of voices.

The storage 110 stores therein various kinds of information. The storage 110 stores therein information such as calculation details of the controller 114 and a program. The storage 110 stores therein, for example, an RSSI value that indicates a radio field strength of the channel at a time of reception of a signal from the leader device 20. The storage unit 110 includes, for example, at least one of a main storage such as a RAM or a ROM, and an external storage device such as an HDD.

The GNSS reception unit 112 is configured with a GNSS receiver or the like that receives GNSS signals from GNSS satellites. The GNSS reception unit 112 outputs the received GNSS signal to a location information acquisition unit 122 of the controller 114.

The controller 114 controls each of the units of the general device 30. The controller 114 includes, for example, an information processing device such as a CPU or an MPU and a storage such as a RAM or a ROM. The controller 114 executes a program that controls operation of the general device 30 according to the present application. The controller 114 may be implemented by, for example, an integrated circuit such as an ASIC or an FPGA. The controller 114 may be implemented by a combination of hardware and software.

The controller 114 includes a communication controller 120, the location information acquisition unit 122, a message generation unit 124, a timer unit 126, a mode setting unit 128, a selection unit 130, and a display controller 132.

The communication controller 120 controls the transmission unit 100 and the reception unit 102. The communication controller 120 causes the transmission unit 100 to transmit various kinds of information to the management device 10 and the leader device 20. The communication controller 120 causes the reception unit 102 to receive various kinds of information from the management device 10 and the leader device 20.

The location information acquisition unit 122 acquires current location information that indicates a current location of the general device 30. The location information acquisition unit 122 acquires the current location information on the general device 30 based on the GNSS signal that is received by the GNSS reception unit 112.

The message generation unit 124 generates, when receiving the group participation request messages from the m leader devices 20, a group participation application message for participating in the group. Details of the message generation unit 124 will be described later.

The timer unit 126 measures a time. The timer unit 126 counts down a time limit for submitting, to the leader device 20, a participation application in the group. Details of the timer unit 126 will be described later.

The mode setting unit 128 sets a mode of the general device 30. The mode setting unit 128, when a group formation request signal is received, sets a group formation mode during a first duration that is determined in advance. Details of the mode setting unit 128 will be described later.

The selection unit 130 determines a radio field strength of each of the leader devices 20. The selection unit 130 selects a leader device with the largest radio field strength from among the multiple leader devices 20. Details of the selection unit 130 will be described later.

The display controller 132 causes the display 106 to display various kinds of information. Details of the display controller 132 will be described later.

Group Generation Process

Process Performed by Leader Device

Figure 7:
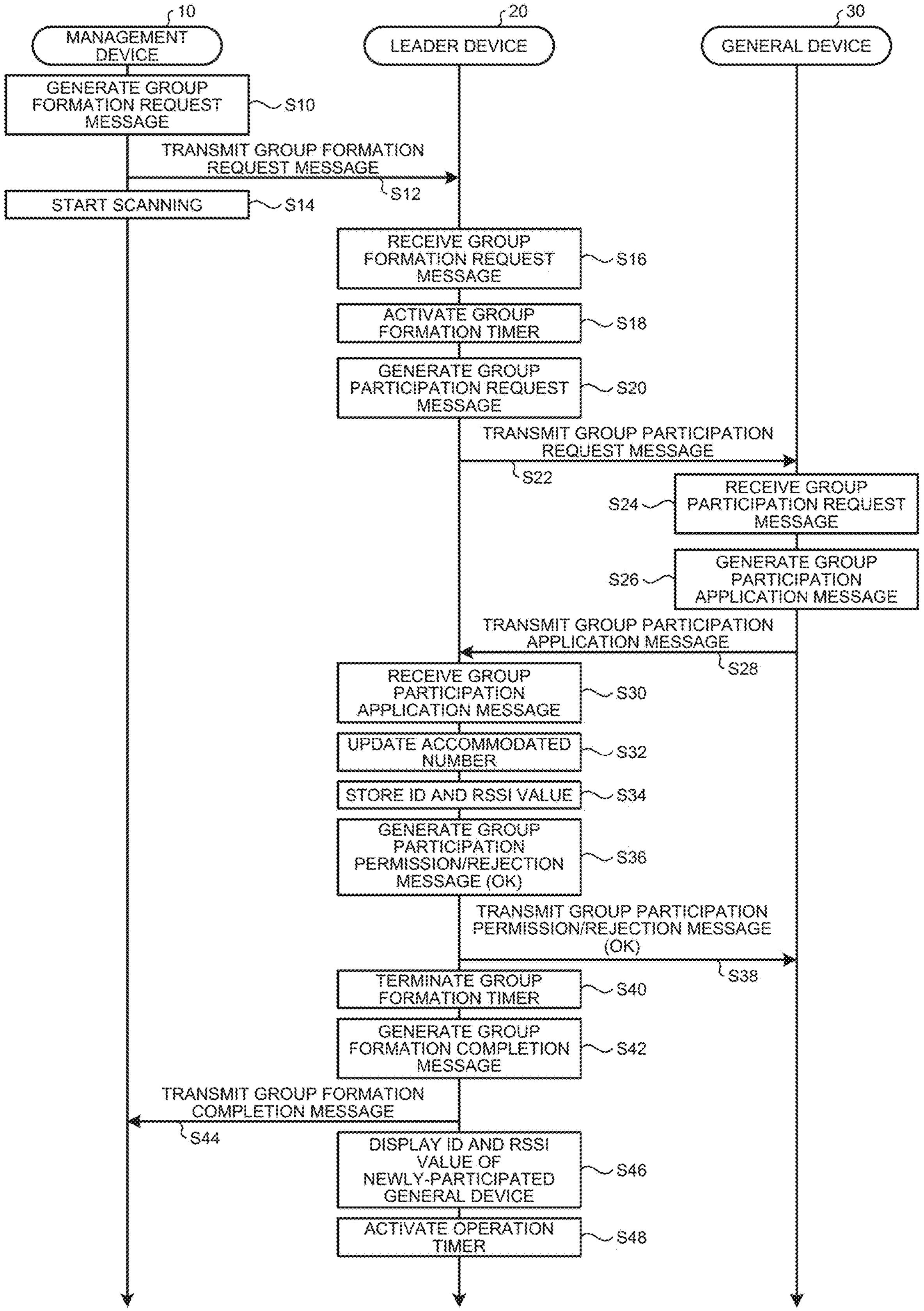
FIG. 7 is a sequence diagram illustrating a flow of a group formation process performed by the wireless communication system according to one embodiment.

A group formation process performed by the wireless communication system according to one embodiment will be described below with reference to FIG. 7. FIG. 7 is a sequence diagram illustrating a flow of the group formation process performed by the wireless communication system according to one embodiment.

FIG. 7 mainly illustrates a process that is performed by the leader device 20 at a time of generation of a group. FIG. 7 illustrates a process for permitting the general device 30 to participate in the group.

In a normal state before generation of a group, channels to be used by the management device 10, the leader devices 20, and the general devices 30 are set to CH1 in the channel list illustrated in FIG. 4. CH1 is a kind of a first channel according to the present embodiment.

The message generation unit 64 of the management device 10 generates the group formation request message for generating a group for performing group communication (Step S10). Specifically, the message generation unit 64 generates the group formation request message in accordance with operation information that is input to the input unit 44 by a manager. The group formation request message may also be referred to as a group formation request signal. Then, the process proceeds to Step S12.

The transmission unit 40 of the management device 10 transmits the group formation request message to the leader devices 20 under control of the communication controller 60 (Step S12). Specifically, the transmission unit 40 transmits the group formation request message to the leader devices 20 by CH1 under the control of the communication controller 60. Then, the process proceeds to Step S14.

The communication controller 60 of the management device 10 starts scanning of each of the channels in the wireless communication system 1 (Step S14). Specifically, the communication controller 60 performs scanning of CH2 to CH9 that are used by the respective leader devices 20 included in the wireless communication system 1. The communication controller 60 continuously performs scanning until a receiving group formation completion message from each of the leader devices 20 in the wireless communication system 1. The scanning indicates a state in which the management device 10 is waiting for a group formation completion message and a group update message from the leader devices 20. Then, the process proceeds to Step S16.

The reception unit 72 of the leader device 20 receives the group formation request message from the management device 10 under control of the communication controller 90 (Step S16). Then, the process proceeds to Step S18.

The timer unit 96 of the leader device 20 activates a group formation timer that defines a time limit for generating a group (Step S18). At the same time, the timer unit 126 of the general device 30 activates a group formation processing timer, which will be described later in a process performed by the general device. The time limit is not specifically limited. Therefore, the timer unit 96 may set the time limit in accordance with the number of the general devices 30 to be grouped. For example, it is preferable for the timer unit 96 to set a longer time limit with an increase in the number of the general devices 30 and set a shorter time limit with a decrease in the number of the general devices 30. Then, the process proceeds to Step S20.

The message generation unit 94 of the leader device 20 generates a group participation request message that indicates a request for the general devices 30 to participate in the group (Step S20). The group participation request message may also be referred to as a group participation request signal. Then, the process proceeds to Step S22.

The transmission unit 70 of the leader device 20 transmits the group participation request message to the general devices 30 under the control of the communication controller 90 (Step S22). Specifically, the transmission unit 70 of each of the leader devices 20 transmits the group participation request message to the general devices 30 by the channel CH1 under the control of the communication controller 90. The communication controller 90 of the leader device 20, after transmitting the group participation request message, switches to a channel that is set for the own device and waits for a group participation application message that is a response from the general device 30. For example, when the leader device 20 is the leader device 20-1, the communication controller 90 of the leader device 20-1 switches the channel from CH1 to CH2 and receives the group participation application message from the general devices 30 by CH2. Here, CH2 is a kind of a second channel according to the present embodiment. The group participation application message will be described later. Each of the leader devices 20 included in the wireless communication system 1 executes, for example, a random access procedure with the management device 10 to prevent a conflict with the group participation request message that is transmitted by other leader devices 20 by CH1. Then, the process proceeds to Step S24.

The reception unit 102 of the general device 30 receives the group participation request message under control of the communication controller 120 (Step S24). Then, the process proceeds to Step S26.

When the group participation request messages are received from the multiple leader devices 20, the selection unit 130 of the general device 30 selects the leader device 20 that participates in the group. Selection of the leader device 20 by the selection unit 130 of the general device 30 will be described later in a process performed by the general device 30. The message generation unit 124 of the general device 30 generates a group participation application message that indicates application for participation in the group for the selected leader device 20 (Step S26). The group participation application message may also be referred to as a group participation application signal. Then, the process proceeds to Step S28.

The transmission unit 100 of the general device 30 switches to the channel that is set for the leader device 20 of the participation group and transmits the group participation application message to the leader device 20 under the control of the communication controller 120 (Step S28). Then, the process proceeds to Step S30.

The reception unit 72 of the leader device 20 receives the group participation application message from the general device 30 under the control of the communication controller 90 (Step S30). Then, the process proceeds to Step S32.

The controller 84 of the leader device 20 updates an accommodated number when the general device 30 is to be newly accommodated in a group (Step S32). The accommodated number indicates the number of the general devices 30 that can be registered in the leader device 20. The accommodated number also indicates the number of the general devices 30 that can participate in the group of the leader device 20. The controller 84 accommodates the new general device 30 when a current accommodated number is equal to or smaller than a maximum accommodated number. Specifically, the controller 84 updates the accommodated number by incrementing a current accommodated number N by one (N+1). Then, the process proceeds to Step S34.

The controller 84 stores an ID of the general device 30 and an RSSI value in the storage 80 (Step S34). Specifically, the controller 84 stores the ID that is an identifier of the general device 30 that has transmitted the group participation application message and the RSSI value at the time of reception of the group participation application message in the storage 80 in an associated manner. Specifically, when the ID of the general device 30 is "UID11" and the RSSI value is "−100 dBm", the controller 84 stores "UID11" and "−100 dBm" in the storage 80 in an associated manner. Then, the process proceeds to Step S36.

The message generation unit 94 of the leader device 20 generates a group participation permission/rejection message (Step S36). Specifically, the message generation unit 94 generates a group participation permission/rejection message (OK) that indicates permission of participation in the group. The group participation permission/rejection message is also referred to as a group participation permission signal. Then, the process proceeds to Step S38.

The transmission unit 70 of the leader device 20 transmits the group participation permission/rejection message (OK) to the general device 30 by the channel that is set for the own device under the control of the communication controller 90 (Step S38). Then, the process proceeds to Step S40.

The timer unit 96 of the leader device 20 waits for a lapse of the time limit and terminates the group formation timer for (Step S40). The device waits for reception of the group participation application message from the general device 30 until the group formation timer is terminated, and when the group participation application message is received, the processes from Step S30 to Step S38 are repeated. Then, the process proceeds to Step S42.

The message generation unit 94 of the leader device 20 generates a group formation completion message that indicates completion of formation of the group (Step S42). The group formation completion message includes the ID and the RSSI value of the newly-participated general device 30. The group formation completion message includes the current location information on the leader device 20 that is acquired by the location information acquisition unit 92 of the leader device 20. The group formation completion message may also be referred to as a group formation completion signal. Then, the process proceeds to Step S44.

The transmission unit 70 of the leader device 20 switches the channel to CH1 and transmits the group formation completion message to the management device 10 under the control of the communication controller 90 (Step S44).

Figure 8:
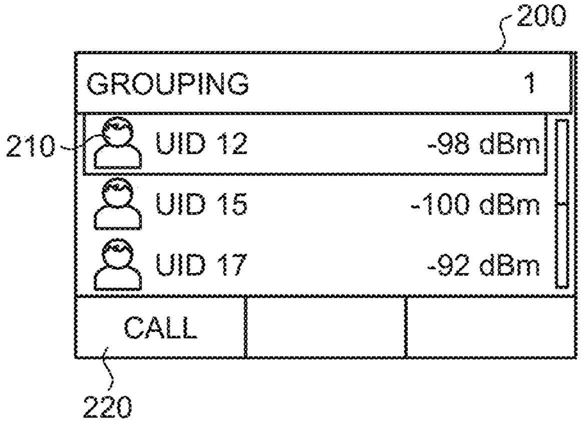
FIG. 8 is a diagram illustrating an example of a display screen of the leader device according to one embodiment.

The display controller 98 of the leader device 20 displays the ID and the RSSI value of the newly-participated general device 30 (Step S46). FIG. 8 is a diagram illustrating an example of a display screen of the leader device according to one embodiment.

As illustrated in FIG. 8, a display screen 200 indicates the general devices 30 that are accommodated in the specific leader device 20. In the display screen 200, icons 210, UIDs, and the RSSI values of the general devices 30 that are accommodated in the specific leader device 20 are displayed. It is indicated that the newly-participated general device 30 has an ID of "UID12" and an RSSI value of "−98 dBm".

When, for example, a user selects "UID12" and presses a Call image button 220 or a PTT button in the display screen 200, the leader device 20 makes a voice call to the general device 30 with "UID12" by the channel that is set for the leader device 20.

Referring back to FIG. 7, the timer unit 96 of the leader device 20 activates an operation timer (Step S48). The operation timer is used to update the RSSI value of the general device 30 that is accommodated in the leader device 20. A process of updating the RSSI value will be described later.

Figure 9A:
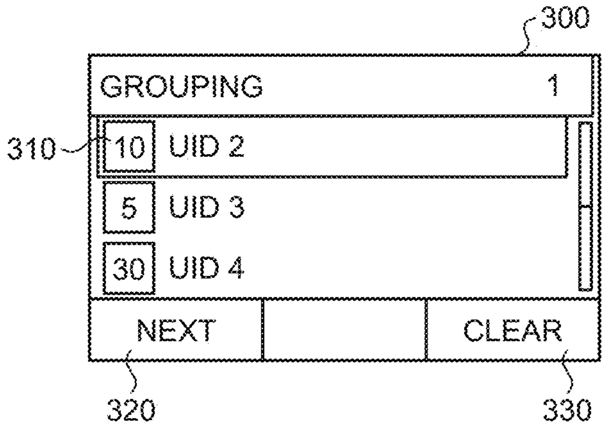
FIG. 9A is a diagram illustrating an example of a display screen of the management device according to one embodiment.
Figure 9B:
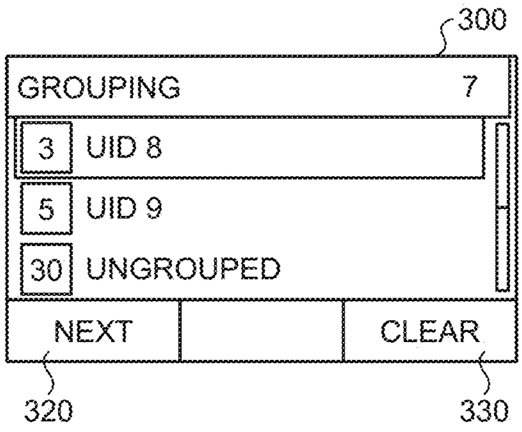
FIG. 9B is a diagram illustrating an example of the display screen of the management device according to one embodiment.

After the process in FIG. 7, the management device 10 receives a group formation completion message from the leader device 20, so that it is possible to cause the display 76 to display the locations of the leader device 20 and the general devices 30 that is included in the group. FIG. 9A and FIG. 9B are diagrams illustrating examples of the display screen of the management device 10 according to one embodiment.

As illustrated in FIG. 9A and FIG. 9B, a display screen 300 indicates the number of the general devices 30 that are accommodated in each of the leader devices 20. The display screen 300 includes number display icons 310, a Next image button 320, and a Clear image button 330.

The number display icon 310 indicates the number of the general devices 30 that are accommodated in the corresponding leader device 20. For example, it is indicated that the leader device 20 with the ID of "UID2" includes the 10 general devices 30. In FIG. 9B, "Ungrouped" indicates the number of the general devices 30 that do not participate in any of groups.

In the display screen 300, for example, when a user selects "UID2" and presses the Next image button 320, details of the general devices 30 that are accommodated in "UID2" are displayed. The Clear image button 330 is a button that is used to break up the group. A manager who uses the management device 10 is able to break up the group by pressing the Clear image button 330 at an arbitrary timing at which the group need not be formed.

Figure 10:
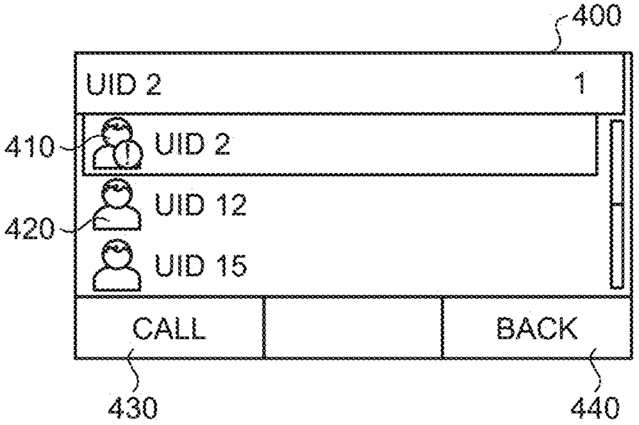
FIG. 10 is a diagram illustrating an example of the display screen of the management device according to one embodiment.

FIG. 10 is a diagram illustrating an example of the display screen of the management device according to one embodiment FIG. 10 is a diagram illustrating details of the general devices 30 that are accommodated in the leader device 20 with the ID of "UID2". As illustrated in FIG. 10, a display screen 400 includes a leader icon 410 that indicates the leader device 20, general icons 420 that indicate the general devices 30, a Call image button 430, and a Back image button 440.

As illustrated in FIG. 10, when "UID2" is selected in FIG. 9A, the display screen 400 displays the leader icon 410 and "UID2" that is the ID of the corresponding leader device 20. The leader icon 410 is added with, for example, an exclamation mark. The display screen 400 displays the general icon 420 and "UID12" that is the ID of the corresponding general device 30. Meanwhile, when "Ungrouped" is selected in FIG. 9B, the display screen 400 displays the general icon 420 indicating the general device 30 that is not permitted to participate in the group and the ID of the corresponding general device 30.

When, for example, a user selects "UID12" and presses the Call image button 430 or a PTT button in the display screen 400, the management device 10 makes a voice call to the general device 30 with "UID12" by a channel CH2 that is a channel set for the leader device 20-1 with "UID2".

Process Performed by Leader Device

Figure 11:
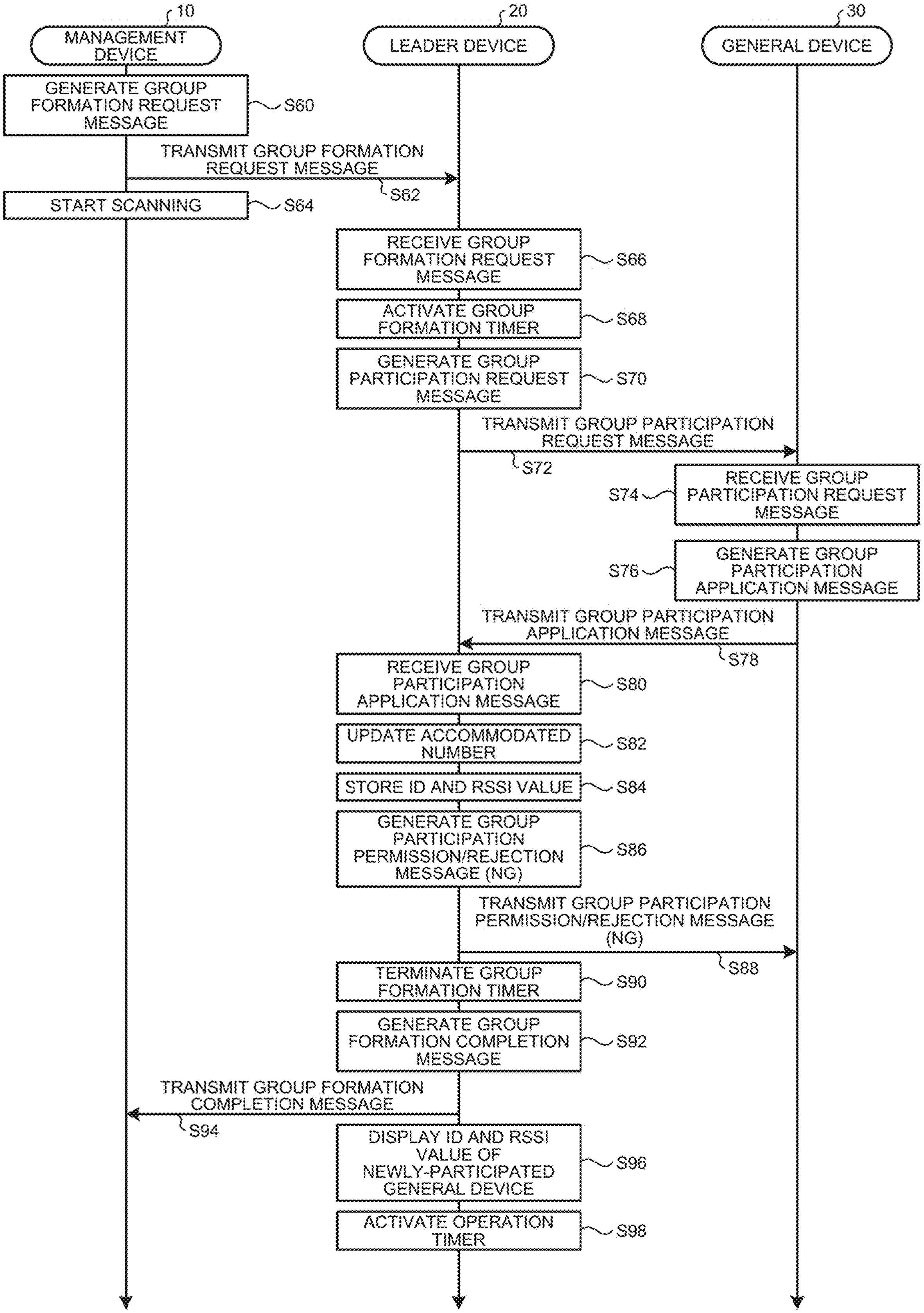
FIG. 11 is a sequence diagram illustrating a flow of a group formation process performed by the wireless communication system according to one embodiment.

A group formation process performed by the wireless communication system according to one embodiment will be described below with reference to FIG. 11. FIG. 11 is a sequence diagram illustrating a flow of the group formation process performed by the wireless communication system according to one embodiment.

FIG. 11 mainly illustrates a process that is performed by the leader device 20 at the time of generation of a group. FIG. 11 illustrates a process for rejecting the general device 30 from participating in the group.

Processes from Step S60 to Step S84 are the same as the respective processes from Step S10 to Step S34 illustrated in FIG. 7, and therefore, explanation thereof will be omitted.

The message generation unit 94 of the leader device 20 generates a group participation permission/rejection message (Step S86). Specifically, since the current accommodated number has reached a maximum value, the message generation unit 94 generates a group participation permission/rejection message (NG) that indicates rejection of participation in the group. Then, the process proceeds to Step S88.

The transmission unit 70 of the leader device 20 transmits the group participation permission/rejection message (NG)

to the general device 30 by the channel that is set for the own device under the control of the communication controller 90 (Step S88).

Processes from Step S90 to Step S98 are the same as the respective processes from Step S40 to Step S48 illustrated in FIG. 7, and therefore, explanation thereof will be omitted.

Process Performed by Leader Device

Figure 12:
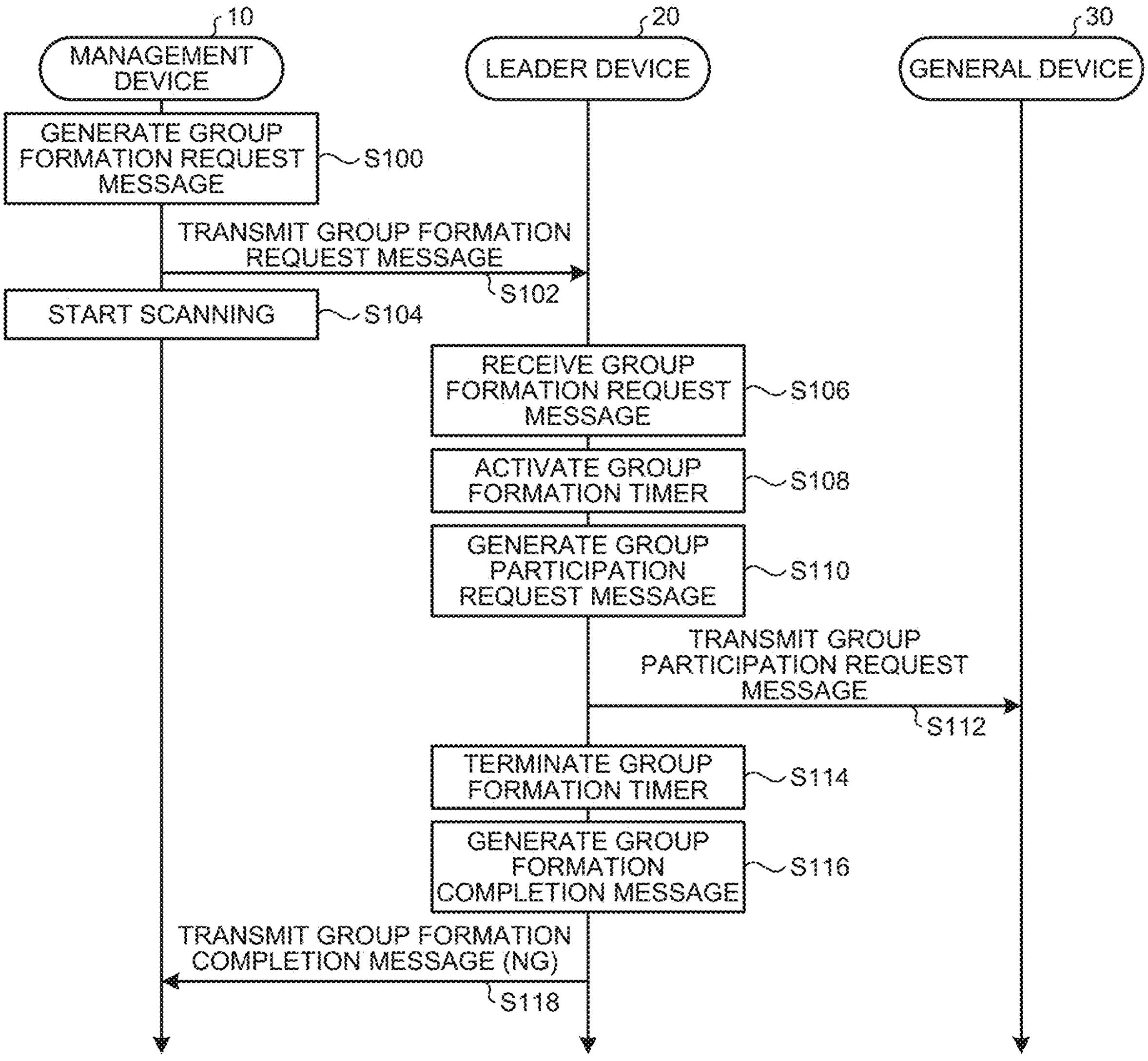
FIG. 12 is a sequence diagram illustrating a flow of a group formation process performed by the wireless communication system according to one embodiment.

A group formation process performed by the wireless communication system according to one embodiment will be described below with reference to FIG. 12. FIG. 12 is a sequence diagram illustrating a flow of the group formation process performed by the wireless communication system according to one embodiment.

FIG. 12 mainly illustrates a process that is performed by the leader device 20 at the time of generation of a group. FIG. 12 illustrates a process in the case where the group participation application message is not received from the general device 30.

Processes from Step S100 to Step S112 are the same as the respective processes from Step S10 to Step S22 illustrated in FIG. 7, and therefore, explanation thereof will be omitted.

The timer unit 96 of the leader device 20 waits for a lapse of the time limit and terminates the group formation timer (Step S114). Specifically, the leader device 20 does not receive the group participation application message from the general device 30 from activation to termination of the group formation timer. Then, the process proceeds to Step S116.

The message generation unit 94 of the leader device 20 generates the group formation completion message (NG) indicating that a group is not formed (Step S116). Then, the process proceeds to Step S118.

The transmission unit 70 of the leader device 20 switches the channel to CH1 and transmits the group formation completion message (NG) to the management device 10 under the control of the communication controller 90 (Step S118). Here, when a group is not formed, the leader device 20 returns to CH1 from the channel that is set for the own device under the control of the communication controller 90. For example, when the leader device 20 is the leader device 20-1, the communication controller 90 of the leader device 20-1 performs a process of returning to CH1 from CH2.

Process Performed by General Device

Figure 13:
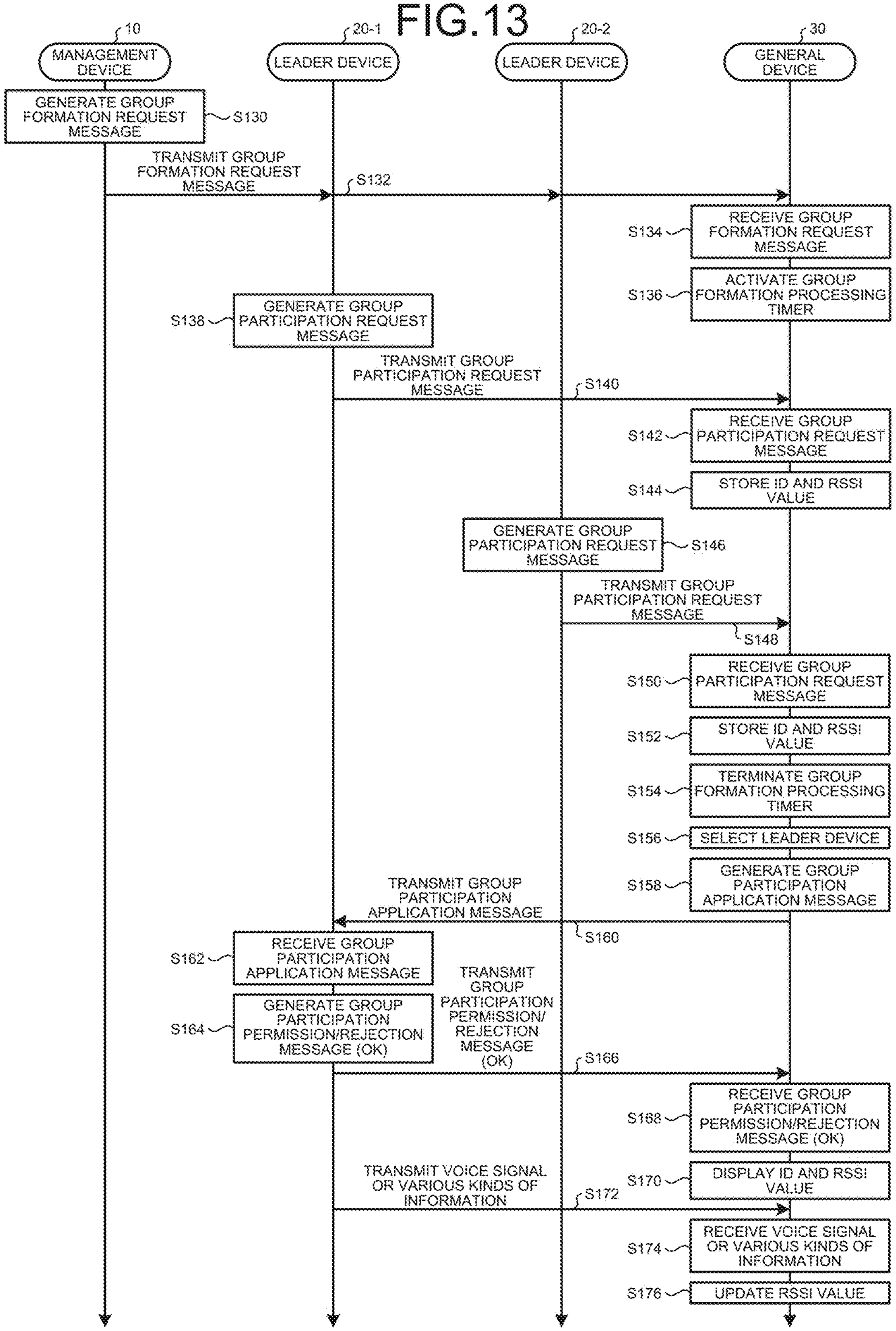
FIG. 13 is a sequence diagram illustrating a flow of a group formation process performed by the wireless communication system according to one embodiment.

A group formation process performed by the wireless communication system according to one embodiment will be described below with reference to FIG. 13. FIG. 13 is a sequence diagram illustrating a flow of the group formation process performed by the wireless communication system according to one embodiment.

FIG. 13 mainly illustrates a process that is performed by the general device 30 at the time of generation of a group. FIG. 13 illustrates a process in the case where the general device 30 submits application for participation in the group. In the example illustrated in FIG. 13, for simplicity of explanation, the two leader devices, that is, the leader device 20-1 and the leader device 20-2 are illustrated as the leader devices 20, but the present disclosure is not limited to this example.

A process at Step S130 is the same as the process at Step S10 illustrated in FIG. 7, and therefore, explanation thereof will be omitted.

The transmission unit 40 of the management device 10 transmits the group formation request message to the leader device 20 and the general device 30 by CH1 under control of the communication controller 60 (Step S132). Then, the process proceeds to Step S134.

The reception unit 102 of the general device 30 receives the group formation request message from the management device 10 under the control of the communication controller 120 (Step S134). Then, the process proceeds to Step S136.

The timer unit 126 of the general device 30 activates the group formation processing timer that adopts a first duration for forming a group as a time limit, and the mode setting unit 128 sets a group formation mode in the general device 30 (Step S136). The time limit is not specifically limited. Therefore, the timer unit 126 may set the time limit in accordance with the number of the general devices 30 to be grouped. For example, it is preferable for the timer unit 126 to set a longer time limit with an increase in the number of the general devices 30 and set a shorter time limit with a decrease in the number of the general devices 30. For example, the timer unit 126 may set the time limit in accordance with the number of the leader devices 20 that are included in the wireless communication system 1. The timer unit 126 may set, for example, a time limit of about one second for each of the leader devices 20. Although not illustrated in the drawings, the timer unit 96 of the leader device 20 that has received the group formation request message from the management device 10 activates the group formation timer that defines a time limit for generating a group as described above. Then, the process proceeds to Step S138.

The message generation unit 94 of the leader device 20-1 generates the group participation request message that indicates a request for the general devices 30 to participate in the group (Step S138). Then, the process proceeds to Step S140.

The transmission unit 70 of the leader device 20-1 transmits the group participation request message to the general device 30 by CH1 under the control of the communication controller 90 (Step S140). Then, the process proceeds to Step S142.

The reception unit 102 of the general device 30 receives the group participation request message from the leader device 20-1 under the control of the communication controller 120 (Step S142). Then, the process proceeds to Step S144.

The controller 114 of the general device 30 stores the ID and the RSSI value of the leader device 20-1 in the storage 110 (Step S144). Specifically, the controller 114 stores the ID of the leader device 20-1 that has transmitted the group participation request message and the RSSI value at the time of reception of the group participation request message in the storage 110 in an associated manner. For example, when the RSSI value is "−98 dBm", the controller 114 stores "UID2" that is the ID of the leader device 20-1 and "−98 dBm" in the storage 110 in an associated manner. Then, the process proceeds to Step S146.

The message generation unit 94 of the leader device 20-2 generates the group participation request message that indicates a request for the general devices 30 to participate in the group (Step S146). Then, the process proceeds to Step S148.

The transmission unit 70 of the leader device 20-2 transmits the group participation request message to the general device 30 by CH1 under the control of the communication controller 90 (Step S148). Then, the process proceeds to Step S150.

The reception unit 102 of the general device 30 receives the group participation request message from the leader device 20-2 under the control of the communication controller 120 (Step S150).

The controller 114 of the general device 30 stores the ID and the RSSI value of the leader device 20-2 in the storage 110 (Step S152). Specifically, the controller 114 stores the ID of the leader device 20-2 that has transmitted the group participation request message and the RSSI value at the time of reception of the group participation request message in the storage 110 in an associated manner. For example, when the RSSI value is "−100 dBm", the controller 114 stores "UID3" that is the ID of the leader device 20-2 and "−100 dBm" in the storage 110 in an associated manner. Then, the process proceeds to Step S154.

The timer unit 126 of the general device 30 waits for a lapse of the first duration and terminates the group formation processing timer, and the mode setting unit 128 cancels the setting of the group formation mode of the general device 30 (Step S154). Then, the process proceeds to Step S156.

In the present embodiment, at Step S136 to Step S154, the general device 30 stores the IDs and the RSSI values, in an associated manner, of the leader device 20-1 and the leader device 20-2, but the present disclosure is not limited to this example. In reality, the general device 30 receives the group participation request messages from the multiple leader devices 20 by the channel CH1. Further, the general device 30 stores the IDs and the RSSI values of the multiple leader devices 20 in the storage 110 in an associated manner.

The selection unit 130 of the general device 30 selects the leader device 20 for participation in the group (Step S156). Specifically, the selection unit 130 refers to the RSSI values that are stored in the storage 110, and selects the leader device 20 with the ID that is associated with the largest RSSI value as the leader device 20 for participation in the group. In the example illustrated in FIG. 13, when, for example, the RSSI value of the leader device 20-1 is "−98 dBm" and the RSSI value of the leader device 20-2 is "−100 dBm", the selection unit 130 selects the leader device 20-1 as the leader device 20 for participation in the group. Then, the process proceeds to Step S158.

The message generation unit 124 of the general device 30 generates the group participation application message that indicates application for participation in the group for the leader device 20-1 (Step S158). Then, the process proceeds to Step S160.

The transmission unit 100 of the general device 30 transmits the group participation application message to the leader device 20-1 under the control of the communication controller 120 (Step S160). Specifically, the transmission unit 100 switches the channel to be used from CH1 to CH2 and transmits the group participation application message to the leader device 20-1 under the control of the communication controller 120. Then, the process proceeds to Step S162.

The reception unit 72 of the leader device 20-1 receives the group participation application message from the general device 30 under the control of the communication controller 90 (Step S162). Although not illustrated in the drawings for the purpose of mainly explaining the process performed by the general device 30, the leader device 20-1 performs processes corresponding to update of the accommodated number (Step S32) and storage of the ID and the RSSI value (Step S34) in FIG. 7. Then, the process proceeds to Step S164.

The message generation unit 94 of the leader device 20-1 generates the group participation permission/rejection message (Step S164). Specifically, the message generation unit 94 of the leader device 20-1 generates the group participation permission/rejection message (OK) that indicates permission of participation in the group. Then, the process proceeds to Step S166.

The transmission unit 70 of the leader device 20-1 transmits the group participation permission/rejection message (OK) to the general device 30 by the channel CH2 under the control of the communication controller 90 (Step S166). Then, the process proceeds to Step S168.

The reception unit 102 of the general device 30 receives the group participation permission/rejection message (OK) from the leader device 20-1 under the control of the communication controller 120 (Step S168). Then, the process proceeds to Step S170.

Figure 14:
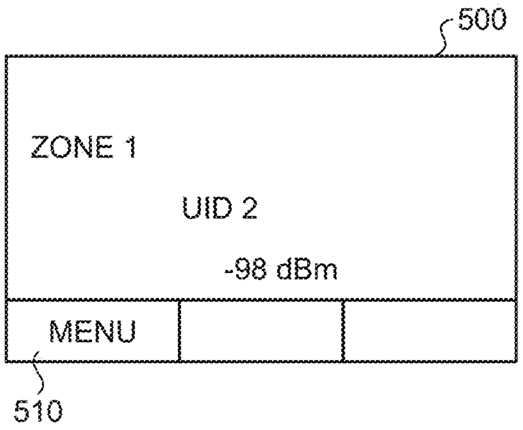
FIG. 14 is a diagram illustrating an example of a display screen of a general device according to one embodiment.

The display controller 132 of the general device 30 displays the ID and the RSSI value of the leader device 20-1 (Step S170). FIG. 14 is a diagram illustrating an example of a display screen of the general device according to one embodiment.

As illustrated in FIG. 14, a display screen 500 displays "UID2" and "−98 dBm" that are the ID and the RSSI value of the leader device 20-1. Accordingly, the user of the general device 30 is able to easily recognize the subject leader device 20 and the RSSI value of the subject leader device 20. In the display screen 500, the user is able to display a main menu for selecting various kinds of operation by pressing a Menu button 510.

Referring back to FIG. 13, the transmission unit 70 of the leader device 20-1 transmits a voice signal or various kinds of information to the general device 30 by the channel CH2 under the control of the communication controller 90 (Step S172).

The reception unit 102 of the general device 30 receives a voice signal or various kinds of information from the leader device 20-1 under the control of the communication controller 120 (Step S174). Then, the process proceeds to Step S176.

The controller 114 of the general device 30 updates the RSSI value of the leader device 20-1 that is stored in the storage 110 (Step S176). Specifically, the controller 114 updates the RSSI value of the leader device 20-1 that is stored in the storage 110 when receiving a voice signal or various kinds of information. Further, the controller 114 may update the RSSI value of the leader device 20-1 at a predetermined interval when the leader device 20-1 transmits a radio field strength update request signal at a predetermined interval of a second duration that is determined in advance, based on the operation timer that is activated at Step S48 in FIG. 7 and at Step S94 in FIG. 11. Accordingly, the RSSI value of the leader device 20-1 that is stored in the storage 110 is updated and it becomes possible to confirm the latest reception state.

Process Performed by General Device

Figure 15:
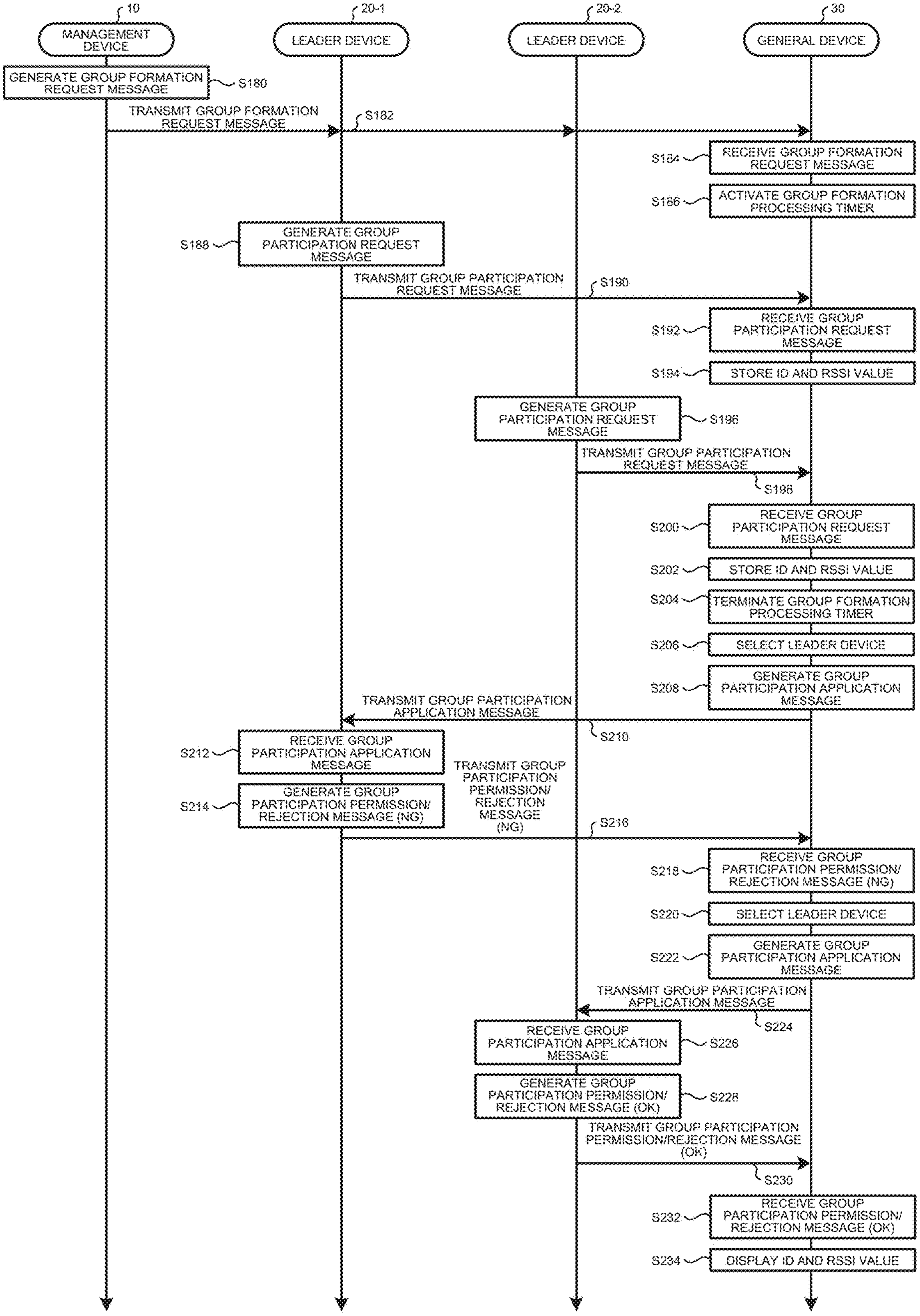
FIG. 15 is a sequence diagram illustrating a flow of a group formation process performed by the wireless communication system according to one embodiment.

A group formation process performed by the wireless communication system according to one embodiment will be described below with reference to FIG. 15. FIG. 15 is a sequence diagram illustrating a flow of the group formation process performed by the wireless communication system according to one embodiment.

FIG. 15 mainly illustrates a process that is performed by the general device 30 at the time of generation of a group. FIG. 15 illustrates a process in which the general device 30 dynamically changes a participation group. In the example illustrated in FIG. 15, for simplicity of explanation, a process for the case where the general device 30 changes a group between the two leader devices 20, that is, the leader device 20-1 and the leader device 20-2, will be described, but the present disclosure is not limited to this example.

Processes from Step S180 to Step S212 are the same as the respective processes from Step S130 to Step S162 illustrated in FIG. 13, and therefore, explanation thereof will be omitted. Further, although not illustrated in FIG. 15 for the purpose of mainly explaining the process performed by the general device 30, the leader device 20-1 performs processes corresponding to update of the accommodated number (Step S32) and storage of the ID and the RSSI value (Step S34) in FIG. 7.

The message generation unit 94 of the leader device 20-1 generates the group participation permission/rejection message (Step S214). Specifically, since the current accommodated number has reached a maximum value, the message generation unit 94 generates the group participation permission/rejection message (NG) that indicates rejection of participation in the group. Then, the process proceeds to Step S216.

The transmission unit 70 of the leader device 20-1 transmits the group participation permission/rejection message (NG) to the general device 30 by the channel CH2 under the control of the communication controller 90 (Step S216). Then, the process proceeds to Step S218.

The reception unit 102 of the general device 30 receives the group participation permission/rejection message (NG) from the leader device 20-1 under the control of the communication controller 120 (Step S218). Then, the process proceeds to Step S220.

The selection unit 130 of the general device 30 selects the leader device 20 for participation in the group (Step S220). Specifically, the selection unit 130 refers to the RSSI values that are stored in the storage 110, and since a message indicating rejection of participation in the group is received from the leader device 20 with the ID that is associated with the largest RSSI value, the selection unit 130 selects the leader device 20-2 with the second largest RSSI value as the leader device 20 for participation in the group. Then, the process proceeds to Step S222.

The message generation unit 124 of the general device 30 generates the group participation application message that indicates application for participation in the group of the leader device 20-2 (Step S222). Then, the process proceeds to Step S224.

The transmission unit 100 of the general device 30 transmits the group participation application message to the leader device 20-2 by the channel CH3 under the control of the communication controller 120 (Step S224). Then, the process proceeds to Step S226.

The reception unit 72 of the leader device 20-2 receives the group participation application message from the general device 30 under the control of the communication controller 90 (Step S226). Although not illustrated in FIG. 15 for the purpose of mainly explaining the process performed by the general device 30, the leader device 20-2 performs processes corresponding to update of the accommodated number (Step S32) and storage of the ID and the RSSI value (Step S34) in FIG. 7. Then, the process proceeds to Step S228.

The message generation unit 94 of the leader device 20-2 generates the group participation permission/rejection message (Step S228). Specifically, the message generation unit 94 of the leader device 20-2 generates the group participation permission/rejection message (OK) that indicates permission of participation in the group. Then, the process proceeds to Step S230.

The transmission unit 70 of the leader device 20-2 transmits the group participation permission/rejection message (OK) to the general device 30 by CH3 under the control of the communication controller 90 (Step S230). Then, the process proceeds to Step S232.

The reception unit 102 of the general device 30 receives the group participation permission/rejection message (OK) from the leader device 20-2 under the control of the communication controller 120 (Step S232). Then, the process proceeds to Step S234.

The display controller 132 of the general device 30 displays the ID and the RSSI value of the leader device 20-2 (Step S234). The display screen is the same as the example illustrated in FIG. 14, and therefore, explanation thereof will be omitted.

Group Update Process

Figure 16:
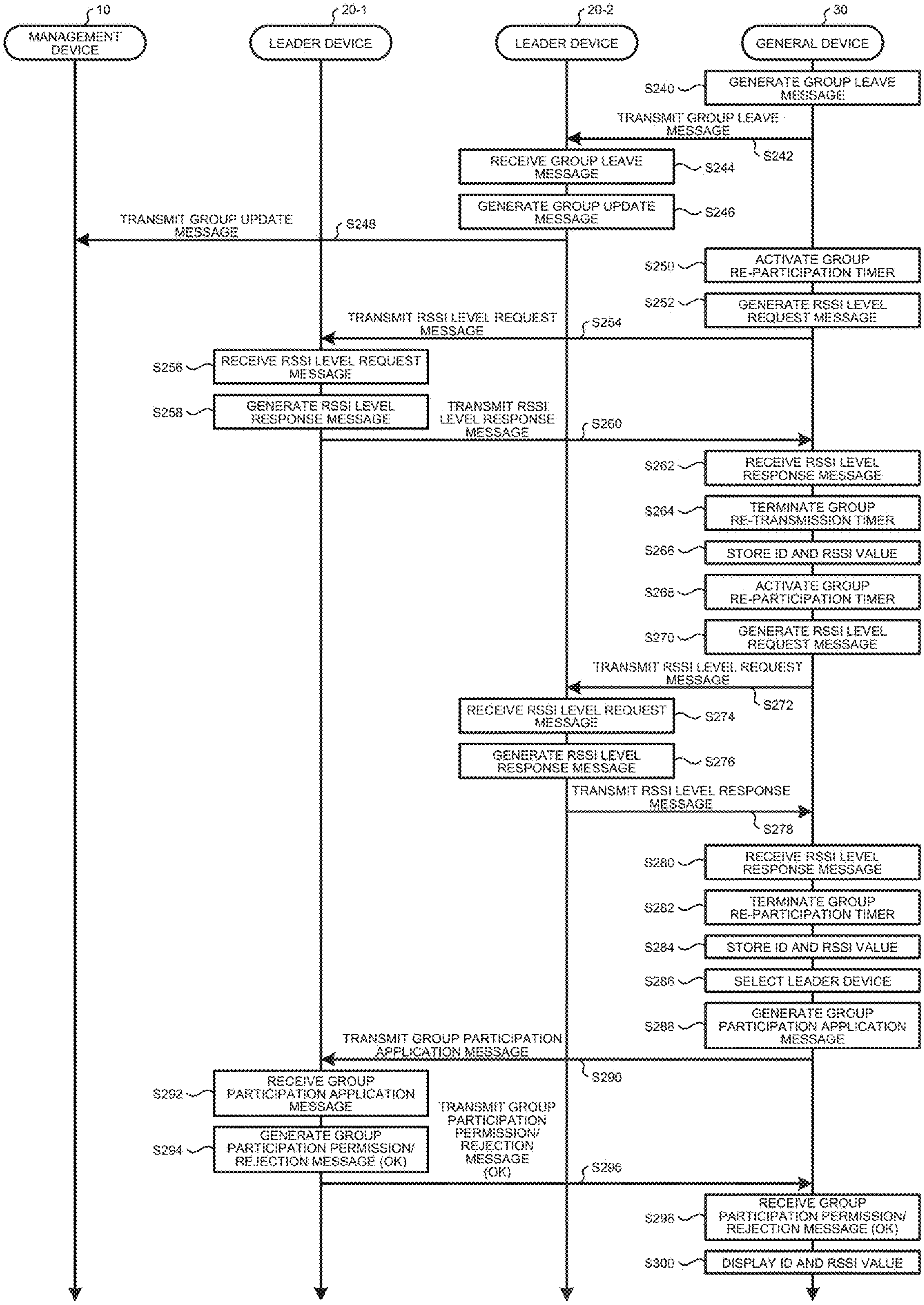
FIG. 16 is a sequence diagram illustrating a flow of a group update process performed by the wireless communication system according to one embodiment.

A group update process performed by the wireless communication system according to one embodiment will be described below with reference to FIG. 16. FIG. 16 is a sequence diagram illustrating a flow of the group update process performed by the wireless communication system according to one embodiment.

FIG. 16 illustrates a process in the case where the general device 30 that has participated in the leader device 20-2 updates the participation group with the leader device 20-1.

The message generation unit 124 of the general device 30 generates a group leave message indicating that the general device 30 leaves from the group of the leader device 20-2 (Step S240). Specifically, the message generation unit 124 generates the group leave message when the controller 114 determines that the RSSI value of the signal received from the leader device 20-2 is smaller than a threshold that is determined in advance. The group leave message may also be referred to as a group leave signal. Although not illustrated in FIG. 16, at Step S174 and Step S176 in FIG. 13 as described above, the general device 30 updates the RSSI value of the leader device 20 every time a voice signal or various kinds of information is received from the leader device 20 in which the general device 30 participates. Further, the RSSI value of the leader device 20 is updated every time the radio field strength update request signal that is transmitted from the leader device 20 of the own group at an interval of the second duration is received, based on the operation timer that is activated at Step S48 in FIG. 7 and at Step S94 in FIG. 11. Then, the process proceeds to Step S242.

The transmission unit 100 of the general device 30 transmits the group leave message to the leader device 20-2 by the channel CH3 under the control of the communication controller 120 (Step S242). Then, the process proceeds to Step S244.

The reception unit 72 of the leader device 20-2 receives the group leave message from the general device 30 under the control of the communication controller 90 (Step S244). Accordingly, although not illustrated in the drawings, the leader device 20-2 detects a change in the general device 30 that is accommodated in the group, and updates the display screen in FIG. 8. Then, the process proceeds to Step S246.

The message generation unit 94 of the leader device 20-2 generates the group update message (Step S246). The group update message may also be referred to as a group update signal. Then, the process proceeds to Step S248. The transmission unit 70 of the leader device 20-2 transmits the group update message to the management device 10 by the channel CH1 under the control of the communication controller 90 (Step S248). Accordingly, although not illustrated in the drawings, the management device 10 detects a change in the general device 30 that is accommodated in the group of the leader device 20-2, and updates the display screens illustrated in FIG. 9A, FIG. 9B, and FIG. 10. Then, the process proceeds to Step S250.

The timer unit 126 of the general device 30 activates a group re-participation timer that defines a time limit for performing a group re-participation process (Step S250).

Specifically, the timer unit 126 activates the group re-participation timer that defines a time limit for executing the re-participation process on the leader device 20-1. Then, the process proceeds to Step S252.

The message generation unit 124 of the general device 30 generates an RSSI level request message that indicates a request for the RSSI value (Step S252). The RSSI level request message may also be referred to as a radio field strength request signal. Then, the process proceeds to Step S254.

The transmission unit 100 of the general device 30 transmits the RSSI level request message to the leader device 20-1 by the channel CH2 under the control of the communication controller 120 (Step S254). Then, the process proceeds to Step S256.

The reception unit 72 of the leader device 20-1 receives the RSSI level request message from the general device 30 under the control of the communication controller 90 (Step S256). Then, the process proceeds to Step S258.

The message generation unit 94 of the leader device 20-1 generates an RSSI level response message for indicating the RSSI value (Step S258). The RSSI level response message may also be referred to as a radio field strength response signal. Then, the process proceeds to Step S260.

The transmission unit 70 of the leader device 20-1 transmits the RSSI level response message to the general device 30 by the channel CH2 under the control of the communication controller 90 (Step S260). Then, the process proceeds to Step S262.

The reception unit 102 of the general device 30 receives the RSSI level response message from the leader device 20-1 under the control of the communication controller 120 (Step S262). Then, the process proceeds to Step S264.

The timer unit 126 of the general device 30 waits for a lapse of the time limit and terminates the group re-participation timer (Step S264). Then, the process proceeds to Step S266.

The controller 114 of the general device 30 stores the ID and the RSSI value of the leader device 20-1 in the storage 110 (Step S266). Specifically, the controller 114 stores the ID of the leader device 20-1 that has transmitted the RSSI level response message and the RSSI value of the signal at the time reception of the RSSI level response message in the storage 110 in an associated manner. For example, when the RSSI value is "−98 dBm", the controller 114 stores "UID2" that is the ID of the leader device 20-1 and "−98 dBm" in the storage 110 in an associated manner. Then, the process proceeds to Step S268.

The timer unit 126 of the general device 30 activates the group re-participation timer that defines a time limit for executing the group re-participation process (Step S268). Specifically, the timer unit 126 activates the group re-participation timer that defines a time limit for executing the re-participation process on the leader device 20-2. Then, the process proceeds to Step S270.

The message generation unit 124 of the general device 30 generates the RSSI level request message that indicates a request for the RSSI value (Step S270). Then, the process proceeds to Step S272.

The transmission unit 100 transmits the RSSI level request message to the leader device 20-2 by the channel CH3 under the control of the communication controller 120 (Step S272). Then, the process proceeds to Step S274.

The reception unit 72 of the leader device 20-2 receives the RSSI level request message from the general device 30 under the control of the communication controller 90 (Step S274).

The message generation unit 94 of the leader device 20-2 generates the RSSI level response message for indicating the RSSI value (Step S276). Then, the process proceeds to Step S278.

The transmission unit 70 of the leader device 20-2 transmits the RSSI level response message to the general device 30 by the channel CH3 under the control of the communication controller 90 (Step S278). Then, the process proceeds to Step S280.

The reception unit 102 of the general device 30 receives the RSSI level response message from the leader device 20-2 under the control of the communication controller 120 (Step S280). Then, the process proceeds to Step S282.

The timer unit 126 of the general device 30 waits for a lapse of the time limit and terminates the group re-participation timer (Step S282). Then, the process proceeds to Step S284.

The controller 114 stores the ID and the RSSI value of the leader device 20-2 in the storage 110 (Step S284). Specifically, the controller 114 stores the ID of the leader device 20-2 that has transmitted the RSSI level response message and the RSSI value at the time of reception of the RSSI level response message in the storage 110 in an associated manner. For example, when the RSSI value is "−100 dBm", the controller 114 stores "UID3" that is the ID of the leader device 20-2 and "−100 dBm" in the storage 110 in an associated manner. Then, the process proceeds to Step S286.

In the present embodiment, at Step S250 to Step S284, the general device 30 stores the IDs and the RSSI values, in an associated manner, of the leader device 20-1 and the leader device 20-2 but the present disclosure is not limited to this example. In reality, the general device 30 transmits the RSSI level request messages to all of the leader devices 20 by respective channels corresponding to the leader devices 20. Then, the general device 30 stores the IDs and the RSSI values of the multiple leader devices 20 in the storage 110 in an associated manner.

The selection unit 130 of the general device 30 selects the leader device 20 of a re-participation group (Step S286). Specifically, the selection unit 130 refers to the RSSI values that are stored in the storage 110, and selects the leader device 20 with the ID that is associated with the largest RSSI value as the leader device 20 for participation in the group. In the present embodiment, a channel that is set for the leader device 20 with the ID that is associated with the largest RSSI value will be referred to as a third channel. In the example illustrated in FIG. 16, the selection unit 130 selects the leader device 20-1 as the leader device 20 for participation in the group. Then, the process proceeds to Step S288.

The message generation unit 124 generates the group participation application message that indicates application for participation in the group for the leader device 20-1 (Step S288). Then, the process proceeds to Step S290.

The transmission unit 100 of the general device 30 transmits the group participation application message to the leader device 20-1 by the channel CH2 under the control of the communication controller 120 (Step S290). In the example illustrated in FIG. 16, CH2 serves as the third channel.

The reception unit 72 of the leader device 20-1 receives the group participation application message from the general device 30 under the control of the communication controller 90 (Step S292). Then, the process proceeds to Step S294.

The message generation unit 94 of the leader device 20-1 generates the group participation permission/rejection message (Step S294). Specifically, the message generation unit 94 of the leader device 20-1 generates the group participation permission/rejection message (OK) that indicates permission of participation in the group. Accordingly, although not illustrated in the drawings, the leader device 20-1 detects a change in the general device 30 that is accommodated in the group, and updates the display screen illustrated in FIG. 8. Then, the process proceeds to Step S296.

The transmission unit 70 of the leader device 20-1 transmits the group participation permission/rejection message (OK) to the general device 30 by the channel CH2 under the control of the communication controller 90 (Step S296). Further, although not illustrated in the drawings, the transmission unit 70 of the leader device 20-1 transmits the group update message to the management device 10 similarly to the process at Step S248 as described above, and gives a notice indicating a change in the general device 30 that is accommodated in the group. Then, the process proceeds to Step S298.

The reception unit 102 of the general device 30 receives the group participation permission/rejection message (OK) from the leader device 20-1 under the control of the communication controller 120 (Step S298). Then, the process proceeds to Step S300.

The display controller 132 of the general device 30 displays the ID and the RSSI value of the leader device 20-1 (Step S300). The display screen is the same as the example illustrated in FIG. 14, and therefore, explanation thereof will be omitted.

As described above, in the present embodiment, the management device 10, the leader device 20, and the general device 30 transmit and receive various kinds of signals to and from one another, so that it is possible to change a group via no base station.

The components of the devices illustrated in the drawings are functionally conceptual, and need not be physically configured in the manner illustrated in the drawings. In other words, specific forms of distribution and integration of the devices are not limited to those illustrated in the drawings, and all or part of the devices may be functionally or physically distributed or integrated in arbitrary units depending on various loads or use conditions. Meanwhile, configurations made by the distribution and the integration as described above may be performed dynamically.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The wireless communication device and the wireless communication method according to the present application can be used for a wireless communication device.

According to the present application, it is possible to form a group via no base station.

What is claimed is:

1. A wireless communication device comprising:

a reception unit configured to receive, by a first channel, a group formation request signal from a management device and a group participation request signal from each of leader devices;

a mode setting unit configured to set, when the group formation request signal is received, a group formation mode in the wireless communication device during a first duration that is determined in advance;

a storage configured to receive the group participation request signal from each of the leader devices and store therein a radio field strength at a time of receiving the group participation request signal and an identifier of the leader device that has transmitted the group participation request signal in an associated manner during a period of the group formation mode;

a selection unit configured to select, when the period of the group formation mode is terminated, the leader device the radio field strength of which, stored in the storage, has a largest value; and a transmission unit configured to transmit, by a second channel that is different from the first channel, a group participation application signal to the leader device that is selected by the selection unit.

2. The wireless communication device according to claim 1, wherein the reception unit is further configured to receive, by the second channel, a group participation permission/rejection signal that is a response to the transmitted group participation application signal, and when the group participation permission/rejection signal is a signal that permits participation in a group, the reception unit and the transmission unit are further configured to communicate with other wireless communication devices by the second channel.

3. The wireless communication device according to claim 1, wherein the storage is further configured to store therein, in advance, a channel list in which the identifier of the leader device is associated with a channel that is used by the leader device, and the second channel is a channel that is associated with the identifier of the leader device the radio field strength of which, stored in the storage, has a largest value.

4. The wireless communication device according to claim 1, further comprising:

a controller configured to cause the transmission unit to transmit a group leave signal by the second channel when the radio field strength of a signal received by the reception unit from the leader device by the second channel is lower than a threshold that is set in advance, wherein the transmission unit is further configured to sequentially transmit, after transmitting the group leave signal, radio field strength request signals to the multiple leader devices by channels that are stored in the storage and associated with the leader devices, the reception unit is further configured to sequentially receive the radio field strength response signals from the multiple leader devices by channels that are associated with the leader devices, the storage is further configured to store therein the radio field strengths of the radio field strength response signals in association with the identifiers of the leader devices that have transmitted the radio field strength response signals, the selection unit is further configured to select the leader device the radio field strength of which, stored in the storage at a time of receiving the radio field strength response signal, has a largest value, and the transmission unit is further configured to transmit the group participation application signal by a third channel that is associated with the leader device that is selected by the selection unit.

5. A wireless communication method comprising:

receiving, by a first channel, a group formation request signal from a management device and a group participation request signal from each of leader devices;

setting, when the group formation request signal is received, a group formation mode in the wireless communication device during a first duration that is determined in advance;

receiving the group participation request signal from each of the leader devices and storing a radio field strength at a time of receiving the group participation request signal and an identifier of the leader device that has transmitted the group participation request signal in an associated manner in a storage during a period of the group formation mode;

selecting, when the period of the group formation mode is terminated, the leader device the radio field strength of which, stored in the storage, has a largest value; and transmitting, by a second channel that is different from the first channel, a group participation application signal to the selected leader device.

* * * * *